(12) United States Patent
Niland

(10) Patent No.: US 7,289,389 B2
(45) Date of Patent: Oct. 30, 2007

(54) RESOLVING DIRECTIONAL INFORMATION IN SONAR ARRAYS

(75) Inventor: Rory Niland, New South Wales (AU)

(73) Assignee: Sonartech Atlas Pty Ltd, New South Wales (AU)

(*) Notice: Subject to any disclaimer, the term of this patent is extended or adjusted under 35 U.S.C. 154(b) by 0 days.

(21) Appl. No.: 10/570,680

(22) PCT Filed: Sep. 3, 2004

(86) PCT No.: PCT/AU2004/001197

§ 371 (c)(1),
(2), (4) Date: Mar. 3, 2006

(87) PCT Pub. No.: WO2005/024461

PCT Pub. Date: Mar. 17, 2005

(65) Prior Publication Data

US 2007/0008821 A1  Jan. 11, 2007

(30) Foreign Application Priority Data

Sep. 4, 2003  (AU) .............................. 2003904831

(51) Int. Cl.
*G01S 15/00* (2006.01)
(52) U.S. Cl. .................................................. 367/103
(58) Field of Classification Search ................ 367/103, 367/119
See application file for complete search history.

(56) References Cited

U.S. PATENT DOCUMENTS 4,849,764 A * 7/1989 van Heyningen ............ 342/381
5,425,000 A   6/1995 Reed et al.
5,436,872 A   7/1995 Gilmour et al.
2005/0007880 A1 * 1/2005 Zimmerman et al. ....... 367/103
2007/0008821 A1 * 1/2007 Niland ........................ 367/118

FOREIGN PATENT DOCUMENTS

| EP | 0 600 242 | 5/1999 |
| GB | 2 208 055 | 2/1989 |
| WO | WO 2005024461 A1 * | 3/2005 |

OTHER PUBLICATIONS

Schmidt, "Multiple Emitter Location and Signal Parameter Estimation", IEEE Transactions of Antennas and Propagation vol. AP-34. No. 3 Mar. 1986.

(Continued)

*Primary Examiner*—Daniel Pihulic
(74) *Attorney, Agent, or Firm*—Fish & Richardson P.C.

(57) ABSTRACT

The invention concerns the resolution of directional information in sonar arrays. In particular it concerns a method for resolving such directional information, which may be useful in hydrographic surveys. The method comprises the steps of receiving a block of sensor data, containing time series from an array of hydrophone sensors, and beamforming to produce beam data including estimates of the directions of arrival from those beams and estimates of source strength. The method further comprises the steps of selecting a subset of the beams and refining the estimates of the directions of arrival from those beams, and, combining the refined estimates of directions of arrival from those beams with either the sensor data or the beam data, and performing a fit to the sensor data or beam data to develop an output containing refined direction of arrival data and refined source strength data.

10 Claims, 2 Drawing Sheets

OTHER PUBLICATIONS

Hayes, "Statistical Digital Signal Processing and Modeling" John Wiley & Sons, Inc, 1996, pp. 463-465.

Ibnkahla (editor), "Signal Processing for Mobile Communications Handbook", CRC Press, 2005.

* cited by examiner

RESOLVING DIRECTIONAL INFORMATION IN SONAR ARRAYS

TECHNICAL FIELD

This invention concerns the resolution of directional information in sonar arrays. In particular it concerns a method for resolving such directional information, which may be useful in hydrographic surveys.

BACKGROUND ART

Active sonar antenna systems collect information about the direction of objects or sound sources as well as their range. In order to achieve angular resolution the antenna must have directional properties. A number of individual omnidirectional hydrographic transducers may be arrayed and operated to obtain the desired directivity.

In general a hydrophone receive array will receive maximum intensity from a steered direction, and will also receive side lobes of lesser intensity offset from the principal direction. The overall pattern is known as the 'beam pattern', and the antenna is generally operated using a process called 'beam forming' to achieve a desired pattern.

Beam forming consists in summing the individual sensor signals with appropriate delays and weights. If it is done in the frequency domain, or in the time domain with narrowband signals, no delays are needed, because they can be incorporated as phase within complex weights.

Beam forming is well understood and produces unambiguous results from simultaneous returns from the bottom, but suffers from a number of drawbacks. It is expensive since a large well populated array is required for good angular resolution. The sensors must also be packed close together to avoid aliasing. Considerable computational resources are required to process the large number of sensors.

Alternatively, interferometric methods may be used. Interferometry provides an alternative to beam forming. The technique consists in estimating the time delays between sensors, either by correlation, or timing the interval between zero crossings; the travel time gives the range and the difference in time of between the two sensors gives the angle. This technique provides very high resolution, the hardware is relatively simple and little processing is required, however there are a number of drawbacks. For instance, the technique needs careful calibration and is unable to resolve more than one source at each range without special fixes. The technique enjoys poor public image and is fragile. The results need intelligent filtering and interpretation.

DISCLOSURE OF THE INVENTION

The invention is a method for resolving directional information in sonar arrays, comprising the steps of:

receiving a block of sensor data, containing time series from an array of hydrophone sensors;

beamforming to produce beam data including estimates of the directions of arrival from those beams and estimates of source strength;

selecting a subset of the beams and refining the estimates of the directions of arrival from those beams; and combining the refined estimates of directions of arrival from those beams with either the sensor data or the beam data, and performing a fit to the sensor data or beam data to develop an output containing refined direction of arrival data and refined source strength data.

In good signal to noise situations, the method may improve angular resolution up to 10-fold over beam forming alone. The method is not limited to processing a single source like an interferometer.

The beam forming may use linear combinations of the complex sensor time series that are specific to the array geometry, placement of the sensors, individual sensor directivity, and transmit ping details including time envelope A subset of the beams may then be heuristically selected. The most powerful beams may be selected, for instance the 8 or 16 most powerful. The selected subset may change over time.

Refining the estimated direction of arrival data of the selected subset of beams may involve applying a variant of the MUSIC algorithm to the selected subset.

MUSIC may refine the estimated direction of arrival data to a resolution of, say, $0.2°$.

Performing a fit may involve using a maximum likelihood fit algorithm.

An Expectation-Maximization (EM) algorithm may be used for the maximum likelihood fit. Alternatively, a Generalized Least-Squares estimator may be used.

The beam phase output from the process is also useful.

BRIEF DESCRIPTION OF THE DRAWINGS

An example of the invention will now be described with reference to the accompanying drawings, in which.

BEST MODES OF THE INVENTION

The approach to resolving directional information from the data streams received by hydrographic arrays is built on the understanding that the desired information is embedded in the data streams from the array transducers. The problem is therefore estimation, rather than blind application of any algorithm.

Figure 1:
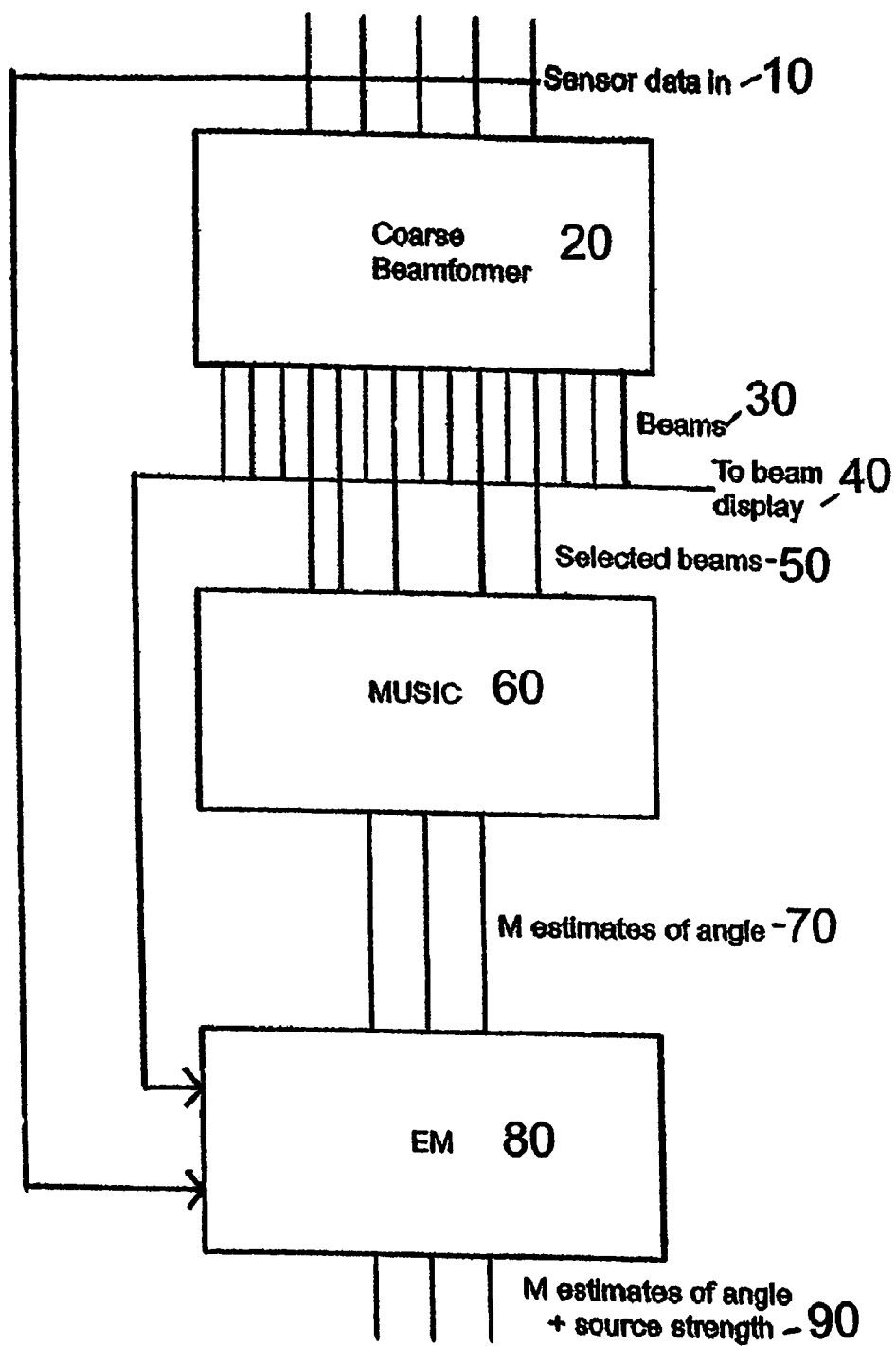
FIG. 1 is a flow chart of the inventive process.

Referring first to FIG. 1, the input is a block of raw data 10 from the hydrophones of a hydrographic array. A block is received for each time instant of sensing. 'Coarse' beams 30 are formed 20 using linear combinations of the sensor (complex) time series. The beamforming weights are specific to the array geometry, placement of the sensors, individual sensor directivity, and transmit ping details including time envelope. The beams are 'coarse' because there are 180 overlapping beams each having approximately $2°$ resolution and they do not have sufficient resolution for hydrography. The beams can be displayed 40 to a user.

At each time step, a variant of the MUSIC algorithm is applied to a selected subset of the beams. Usually MUSIC is an expensive process, involving a search through a large number of inputs.

Figure 2:
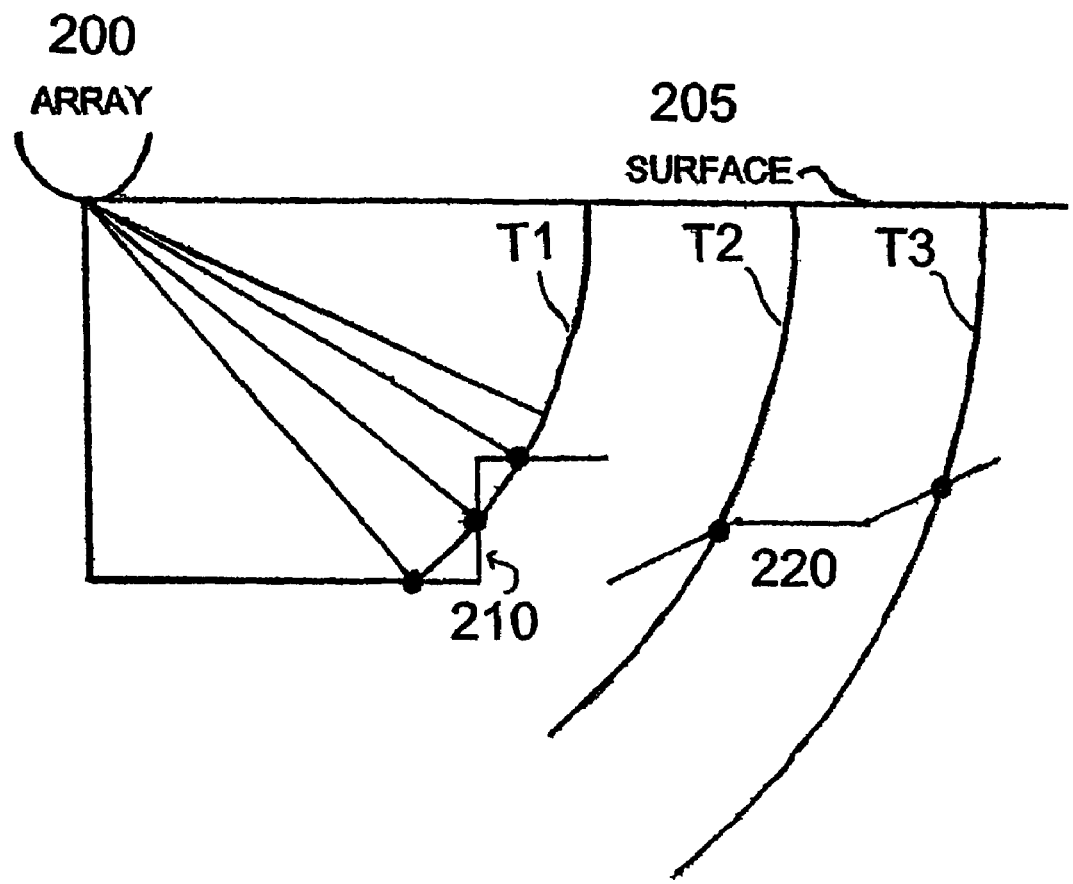
FIG. 2 is a diagram of beams and wavefronts encountering the sea floor.

In the hydrographic situation most of the wavefront is in clear water, see FIG. 2. The array 200 is seen to receive four numbered beams under the surface of the water 205. At time T1 three of the beams encounter a square object 210, but the other beam does not at that instant. At later times T2 and T3 only one of the beams encounters the bottom 220.

Only the few beams that intersect the bottom at any time instant are worth looking at, and these beams are heuristically picked out 50. A maximum number of selected beams is prescribed and the MUSIC algorithm 60 is set up to search within that maximum, which reduces the process to manageable proportions.

The phase information contained in the selected beams (no use is made of amplitude information) is combined by the MUSIC algorithm 60 to produce a much finer angular estimate of the source position 70, say up to 0.3° resolution.

The method of MUSIC is based on correlation of beams. It is nonlinear and is able to make better estimates than any linear method such as beamforming. If there are multiple sources at any time instant they can all be estimated. Application of the MUSIC algorithm involves computation of the time-averaged covariance matrix of the selected beams, and an eigen-analysis of them.

The final step in the process involves combining the resulting block of data which defines the refined angular resolution of the beams obtained from the MUSIC algorithm, with either the original block of sensor data or with the corresponding block of crude source angle data obtained from the beamformer. This process develops an estimated output containing refined angle data and refined source strength data.

To achieve this the predetermined number of fine angular estimates for each instant 70 are then fed to the final stage where they are combined with the echo amplitude information by performing a maximum likelihood fit to each time block of data 80. Again, this usually expensive process is made feasible by the earlier reduction of the problem.

An Expectation-Maximization (EM) algorithm is used for this purpose. Starting with excellent estimates of the source positions (at the given time instant), this algorithm attempts to slightly vary them to match the observed data as well as possible. In practice we do not observe a great improvement over the angle estimates coming from the MUSIC algorithm, but the final stage provides optimal estimates of source strengths, and also guarantees the estimates are not biased by any ad hoc assumptions made in the earlier stages 90.

The optimal beamforming weights are calculated in advance to create tables that are used during the real time beamforming process. The weights are created using a diffraction truncation process.

The MUSIC algorithm can be understood as follows: Suppose there are N sensors, ensonified by a point source at infinity emitting a monofrequency signal. The N sensor amplitudes form a complex time-independent N-vector $\alpha(\theta)$, called a steer vector or array response vector. As the source bearing $\theta$ changes, the steer vector moves in complex N-space. This line or 1D manifold is called the array manifold.

If there are for example two sources, at $\theta_1$, $\theta_2$, there are two corresponding points on the manifold. The 2D subspace (plane) containing these points and the origin contains all linear combinations of the two special steer vectors $\alpha(\theta_1)$, $\alpha(\theta_2)$, and therefore contains all steer vectors that can occur with varying amplitudes and phases from the two sources.

The importance of the plane (also known as the signal subspace) is that it can be estimated from observations, the correlation matrix R of the sensor signals. In fact the two eigenvectors of R corresponding to the two largest eigenvalues span the plane.

MUSIC consists in forming R, obtaining its eigensystem, and so getting the signal subspace. Then the steer vector for every angle (hence every point on the array manifold) is checked to see if it lies in the signal subspace. Usually, because R is noisy, the signal subspace is only an approximation, and we settle for the $\theta$s whose steer vectors lie close to the signal subspace.

All of this applies for a general number M of sources provided M<=N (where N is the number of array sensors). The signal subspace then has dimension M and is spanned by the largest M eigenvectors of R. MUSIC's computational cost increases rapidly with the dimension.

Beams already have some "information concentration" done, in that their R is much more sparse—only close beams tend to be correlated. And, in fact a typical beam uses less than all the sensors. By choosing the most powerful set of beams, such as the 8 or 16 strongest beams the complexity is reduced to manageable proportions.

Other heuristics might also work for selection of the beams, for instance the most powerful plus some at random; or the most powerful beams on a subset chosen to keep the correlation not too large (or small).

MUSIC basically gives the size of the component which is orthogonal to the signal subspace of the trial vector as a function of bearing. So we seek the minima of this function which gives a bearing estimate. There are the usual minor difficulties and ad hoc choices.

The estimation method we use is based on the Maximum Likelihood Estimator (MLE). If the computational load involved in its implementation is too heavy, it can be approximated by a Generalized Least-Squares (GLS) estimator that is computationally much simpler but less accurate.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for resolving directional information in sonar arrays, comprising the steps of:
   receiving a block of sensor data, containing time series from an array of hydrophone sensors;
   beamforming to produce beam data including estimates of the directions of arrival from those beams and estimates of source strength;
   selecting a subset of the beams and refining the estimates of the directions of arrival from those beams; and
   combining the refined estimates of directions of arrival from those beams with either the sensor data or the beam data, and performing a fit to the sensor data or beam data to develop an output containing refined direction of arrival data and refined source strength data.

2. A method according to claim 1, wherein the beamforming uses linear combinations of a complex sensor time series that are specific to the array geometry, placement of the sensors, individual sensor directivity, and transmit ping details including time envelope.

3. A method according to claim 2, wherein a subset of the beams is then heuristically selected.

4. A method according to claim 3, wherein the most powerful beams are selected.

5. A method according to claim 1, wherein the step of refining the estimated direction of arrival data of the selected subset of beams involves applying a variant of MUSIC algorithm to the selected subset.

6. A method according to claim 5, wherein MUSIC refines the estimated direction of arrival data to a resolution of, say, 0.2°.

7. A method according to claim 1, wherein the step of performing a fit involves using a maximum likelihood fit algorithm.

8. A method according to claim 7, wherein an Expectation-Maximization (EM) algorithm is used for the maximum likelihood fit.

9. A method according to claim 7, wherein a Generalized Least-Squares estimator is used for the maximum likelihood fit.

10. A method according to claim 5, wherein the variant of MUSIC utilizes phase information contained in the selected beams.

* * * * *